(12) United States Patent
Bookbinder et al.

(10) Patent No.: US 11,125,937 B2
(45) Date of Patent: Sep. 21, 2021

(54) OPTICAL FIBERS HAVING A VARYING CLAD INDEX AND METHODS OF FORMING SAME

(71) Applicant: Corning Incorporated, Corning, NY (US)

(72) Inventors: Dana Craig Bookbinder, Corning, NY (US); Paul Andrew Chludzinski, Hampstead, NC (US); Brian Lee Harper, Painted Post, NY (US); Ming-Jun Li, Horseheads, NY (US); Snigdharaj Kumar Mishra, Wilmington, NC (US); Sonya Marie Raney, Wrightsville Beach, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 116 days.

(21) Appl. No.: 16/124,775

(22) Filed: Sep. 7, 2018

(65) Prior Publication Data
US 2019/0004245 A1    Jan. 3, 2019

Related U.S. Application Data

(62) Division of application No. 15/702,961, filed on Sep. 13, 2017, now Pat. No. 10,146,008.
(Continued)

(51) Int. Cl.
*C03B 37/014* (2006.01)
*C03B 37/018* (2006.01)
(Continued)

(52) U.S. Cl.
CPC ......... *G02B 6/0286* (2013.01); *C03B 37/018* (2013.01); *C03B 37/01413* (2013.01);
(Continued)

(58) Field of Classification Search
CPC ........ C03B 37/01446; C03B 37/01853; C03B 37/01466; C03B 37/01473; C03B 2201/08; C03B 2201/22; C03B 2201/23
See application file for complete search history.

(56) References Cited

U.S. PATENT DOCUMENTS 4,610,709 A * 9/1986 Kawauchi ......... C03B 37/01446
65/397
4,629,485 A   12/1986 Berkey
(Continued)

FOREIGN PATENT DOCUMENTS

CN    102778722 A    11/2012
CN    105209946 A    12/2015
(Continued)

OTHER PUBLICATIONS

International Search Report and Written Opinion PCT/US2017/051138 dated May 23, 2018.
(Continued)

*Primary Examiner* — Jason L Lazorcik
(74) *Attorney, Agent, or Firm* — Kevin L. Bray

(57) ABSTRACT

An optical fiber with low attenuation and methods of making same are disclosed. The optical fiber has a core, an inner cladding surround the core, and an outer cladding surrounding the inner cladding. The outer cladding is chlorine-doped such that the relative refractive index varies as a function of radius. The radially varying relative refractive index profile of the outer cladding reduces excess stress in the core and inner cladding, which helps lower fiber attenuation while also reducing macrobend and microbend loss. A process of
(Continued)

fabricating the optical fiber includes doping an overclad soot layer of a soot preform with chlorine and then removing a portion of the chlorine dopant from an outermost region of the overclad soot layer. The soot preform with the modified chlorine dopant profile is then sintered to form a glass preform, which can then be used for drawing the optical fiber.

8 Claims, 12 Drawing Sheets

Related U.S. Application Data

(60) Provisional application No. 62/397,506, filed on Sep. 21, 2016.

(51) Int. Cl.
    *C03B 37/025*     (2006.01)
    *G02B 6/028*     (2006.01)
    *G02B 6/02*     (2006.01)
    *G02B 6/036*     (2006.01)

(52) U.S. Cl.
    CPC .. *C03B 37/01446* (2013.01); *C03B 37/01466* (2013.01); *G02B 6/0283* (2013.01); *G02B 6/02214* (2013.01); *G02B 6/03627* (2013.01); *G02B 6/03644* (2013.01); *C03B 37/025* (2013.01); *C03B 2201/08* (2013.01); *C03B 2201/20* (2013.01); *C03B 2207/70* (2013.01)

(56) References Cited

U.S. PATENT DOCUMENTS

| | | | | |
|---|---|---|---|---|
| 4,731,103 | A * | 3/1988 | Mizutani | C03B 37/0142 65/378 |
| 4,735,475 | A | 4/1988 | Watanabe et al. | |
| 4,810,276 | A * | 3/1989 | Gilliland | C03B 37/01446 65/31 |
| 4,906,268 | A | 3/1990 | Lane et al. | |
| 5,044,716 | A | 9/1991 | Berkey | |
| 5,055,121 | A * | 10/1991 | Kanamori | C03B 37/01493 65/398 |
| 5,217,516 | A * | 6/1993 | Ishiguro | C03B 37/01446 65/397 |
| 5,656,057 | A | 8/1997 | Brown et al. | |
| 5,917,109 | A * | 6/1999 | Berkey | C03B 37/01473 65/412 |
| 6,003,342 | A * | 12/1999 | Ishida | C03B 37/0142 118/627 |
| 6,116,055 | A * | 9/2000 | Ishikawa | C03B 37/01446 65/399 |
| 6,751,389 | B2 | 6/2004 | Tirloni | |
| 6,791,389 | B2 | 6/2004 | Tirloni | |
| 7,159,418 | B2 * | 1/2007 | Matsuo | C03B 19/1423 65/17.4 |
| 8,542,969 | B2 * | 9/2013 | Bookbinder | G02B 6/03627 385/126 |
| 8,644,664 | B2 | 2/2014 | Molin et al. | |
| 8,891,925 | B2 | 11/2014 | Bickham et al. | |
| 9,108,876 | B2 | 8/2015 | Dawes et al. | |
| 9,170,369 | B2 | 10/2015 | Wang et al. | |
| 9,188,736 | B2 | 11/2015 | Mishra et al. | |
| 9,290,405 | B2 | 3/2016 | Harper et al. | |
| 2002/0194877 | A1 | 12/2002 | Chang et al. | |
| 2003/0063880 | A1 | 4/2003 | Koumura et al. | |
| 2003/0079504 | A1 * | 5/2003 | Boek | C03B 37/0146 65/424 |
| 2003/0174988 | A1 | 9/2003 | Bickham et al. | |
| 2003/0221459 | A1 * | 12/2003 | Walczak | C03B 37/0146 65/398 |
| 2004/0076392 | A1 * | 4/2004 | Bickham | G02B 6/02004 385/127 |
| 2004/0118164 | A1 * | 6/2004 | Boek | C03B 37/01446 65/398 |
| 2004/0237595 | A1 * | 12/2004 | Fogliani | C03B 37/0148 65/421 |
| 2005/0000250 | A1 * | 1/2005 | Humbach | C03B 37/0142 65/413 |
| 2006/0137398 | A1 * | 6/2006 | Bleaking | C03C 3/06 65/17.3 |
| 2007/0062337 | A1 * | 3/2007 | Dai | C03B 37/01231 76/108.1 |
| 2007/0104437 | A1 * | 5/2007 | Bookbinder | G02B 6/02357 385/125 |
| 2008/0013905 | A1 * | 1/2008 | Bookbinder | G02B 6/02342 385/124 |
| 2008/0276650 | A1 * | 11/2008 | Bookbinder | C03B 37/02781 65/402 |
| 2008/0285929 | A1 | 11/2008 | Shimotakahara | |
| 2008/0317418 | A1 | 12/2008 | Taniguchi et al. | |
| 2009/0202211 | A1 * | 8/2009 | Bickham | G02B 6/02357 385/125 |
| 2012/0202674 | A1 * | 8/2012 | LeBlond | C03B 19/1453 501/31 |
| 2013/0133375 | A1 * | 5/2013 | Fabian | C03B 19/1415 65/377 |
| 2013/0133377 | A1 * | 5/2013 | Fabian | C03B 37/012 65/414 |
| 2013/0133378 | A1 * | 5/2013 | Fabian | C03B 37/01807 65/421 |
| 2013/0136407 | A1 | 5/2013 | Berkey et al. | |
| 2014/0268815 | A1 * | 9/2014 | Li | F21K 9/69 362/311.02 |
| 2015/0225280 | A1 * | 8/2015 | Harper | C03B 37/01453 65/399 |
| 2015/0329404 | A1 * | 11/2015 | Miyabe | C03B 37/0142 385/123 |
| 2016/0131832 | A1 | 5/2016 | Haruna | |
| 2016/0299289 | A1 * | 10/2016 | Bookbinder | G02B 6/03694 |
| 2017/0003445 | A1 | 1/2017 | Bookbinder et al. | |
| 2017/0242186 | A1 | 8/2017 | Mishra et al. | |

FOREIGN PATENT DOCUMENTS

| | | |
|---|---|---|
| EP | 0181595 A2 | 5/1986 |
| JP | 02139504 A | 5/1990 |
| JP | 2002053344 A | 2/2002 |

OTHER PUBLICATIONS

English Translation of CN201780058352.4 Office Action dated Aug. 24, 2020; 5 Pages; Chinese Patent Office.
Chinese Patent Application No. 201780058352A, Office Action dated May 9, 2020, 13 pages (7 pages of English Translation and 6 pages of Original Document); Chinese Patent Office.
English Translation of CN201780058352.4 Office Action dated May 19, 2020; 11 Pages; Chinese Patent Office.

* cited by examiner

OPTICAL FIBERS HAVING A VARYING CLAD INDEX AND METHODS OF FORMING SAME

This application is a divisional of U.S. application Ser. No. 15/702,961, filed Sep. 13, 2017, which claims the benefit of priority under 35 U.S.C. § 119 of U.S. Provisional Application Ser. No. 62/397,506 filed on Sep. 21, 2016 the contents of which are relied upon and incorporated herein by reference in its entirety.

FIELD

The present disclosure relates generally to optical fibers, and particularly to low attenuation optical fibers with a varying clad index and methods of forming same.

BACKGROUND

Glass optical fibers with low attenuation have recently been of significant interest in the telecommunications field. Techniques for improving attenuation properties can play important roles in many types of fibers, including transmission fibers used in long distance applications, multimode fibers used in the emerging area of fiber to the home applications, and dispersion compensation fibers where bending loss has limited many designs from practical use.

SUMMARY

An aspect of the disclosure is an optical fiber having a radial coordinate r and that includes: a core having an outer radius $r_1$ and a relative refractive index $\Delta_1(r)$ having a maximum value $\Delta_{1MAX}$, the core being centered on a central axis and having an alpha value greater than 1; an inner cladding immediately surrounding the core and having a relative refractive index $\Delta_2$ and an outer radius $r_2$ greater than 9 microns; an outer cladding immediately surrounding the inner cladding and having an outer radius $r_3$ and a relative refractive index $\Delta_3(r)$ that includes at a radius $r=r_{MAX}$, a maximum relative refractive index $\Delta_{3MAX}>\Delta_2$, and that includes at a radius $r=r_{MIN}$ and minimum relative refractive index $\Delta_{3MIN}$, wherein $r_{MIN}>r_{MAX}$; wherein: i) $\Delta_{1MAX}>\Delta_{3MAX}>\Delta_2$; ii) $\Delta_{3MAX}-\Delta_2>0.005$ $\Delta$ %; and iii) $\Delta_{3MAX}-\Delta_{3MIN}\geq 0.01$ $\Delta$ %; and wherein the outer cladding comprises chlorine doped silica with a chlorine concentration C that varies with the radial coordinate.

Another aspect of the disclosure is the optical fiber as described above, wherein the alpha value is less than 10.

Another aspect of the disclosure is the optical fiber as described above, wherein the chlorine concentration C has a maximum chlorine concentration $C_{MAX}$ at a radial coordinate $r_{C-MAX}$ between $r_2$ and 40 microns and a minimum chlorine concentration $C_{MIN}$ at a radial coordinate $r_{C-MIN}$ between r=40 microns and $r_3$=62.5 microns, wherein $C_{MAX}$ is at least 1000 parts per million (ppm) greater than $C_{MIN}$.

Another aspect of the disclosure is the optical fiber as described above, wherein $C_{MAX}$ is at least 1500 ppm greater than $C_{MIN}$.

Another aspect of the disclosure is the optical fiber as described above, wherein $C_{MAX}$ is at least 2,000 ppm greater than $C_{MIN}$.

Another aspect of the disclosure is the optical fiber as described above and having an attenuation of less than 0.185 dB/km at a wavelength of 1550 nm.

Another aspect of the disclosure is the optical fiber as described above and having a bend loss for a 20 mm diameter mandrel of less than 0.5 dB/turn.

Another aspect of the disclosure is the optical fiber as described above and having a zero dispersion wavelength $\lambda o$, wherein 1300 nm$\leq \lambda o \leq$1324 nm.

Another aspect of the disclosure is the optical fiber as described above and having a mode-field diameter (MFD) at a wavelength of 1310 nm between 8.8 microns and 9.5 microns.

Another aspect of the disclosure is the optical fiber as described above and having a cable cutoff of less than or equal to 1260 nm.

Another aspect of the disclosure is a method of forming an optical fiber having a core and a cladding. The method includes: a) performing an overclad laydown process on a core cane to create a silica soot preform having a soot overclad layer disposed around the core cane, wherein the silica soot perform has a tailored radial soot density profile; b) doping the soot overclad layer with chlorine using an overclad consolidation process to form a chlorine doped and partially consolidated silica soot preform; c) further consolidating the chlorine doped and partially consolidated silica soot preform to form a void-free chlorine doped and consolidated glass preform; and d) drawing the chlorine void-free doped and consolidated glass preform to form the optical fiber.

Another aspect of the disclosure is the method described above and further including removing a portion of the chlorine from an outermost region soot overclad layer of the doped and partially consolidated silica soot preform to define a radially varying chlorine concentration in the soot overclad layer.

Another aspect of the disclosure is the method as described above, wherein the act of removing a portion of the chlorine is accomplished by exposing the outermost region of the soot overclad layer to at least one of oxygen and water.

Another aspect of the disclosure is the method as described above, wherein the act of removing a portion of the chlorine is accomplished by exposing the outermost region of the soot overclad layer to a dry atmosphere having at least one of helium, nitrogen and argon.

Another aspect of the disclosure is the method as described above, wherein the act b) of doping with chlorine includes exposing the soot overclad layer to at least one of $Cl_2$ and $SiCl_4$.

Another aspect of the disclosure is the method as described above, wherein the act b) of doping with chlorine includes exposing the soot overclad layer to carbon monoxide.

Another aspect of the disclosure is the method as described above, wherein the act a) of forming the soot overclad layer includes i) comparing an index profile of an index parameter for a test optical fiber formed from a preform that has a first soot overclad layer with an annular soot density profile to a reference optical fiber that has a desired index profile to determine a profile fit error; ii) dividing the profile fit error by a sensitivity of the index parameter to a soot density to define a soot density error; iii) subtracting the soot density error from the annular soot density profile to define a modified annular soot density profile; and iv) forming the soot overclad layer using the modified soot density profile to form the silica soot preform.

Another aspect of the disclosure is the method as described above, further including an additional act v) of forming another test optical fiber using the silica soot preform of act iv) and then repeating acts i) through v) until the soot density error falls below a soot density error threshold value.

Another aspect of the disclosure is the optical fiber as described above, wherein the index profile comprises a relative refractive index profile and the index parameter is a relative refractive index.

Another aspect of the disclosure is the optical fiber as described above, wherein the index profile comprises a normalized refractive index profile and the index parameter is a normalized refractive index.

Additional features and advantages of embodiments will be set forth in the detailed description which follows, and in part will be readily apparent to those skilled in the art from that description or recognized by practicing embodiments as described herein, including the detailed description which follows, the claims, as well as the appended drawings.

It is to be understood that both the foregoing general description and the following detailed description present embodiments, and are intended to provide an overview or framework for understanding the nature and character of embodiments as they are claimed. The accompanying drawings are included to provide a further understanding of embodiments, and are incorporated into and constitute a part of this specification. The drawings illustrate various embodiments, and together with the description serve to explain the principles and operations of embodiments.

DETAILED DESCRIPTION

Definitions

Figure 1A:
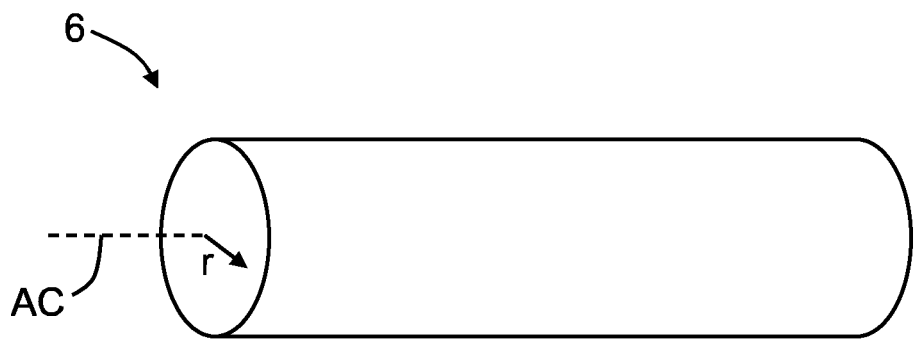
FIG. 1A is a side view and FIG. 1B is a schematic cross sectional view of an optical fiber according to one or more embodiments shown and described herein.

As used herein, an updopant is a material or dopant that increases the refractive index of the glass relative to pure silica. Such updopants may be, for example, chlorine, germania, N, phosphorous, titania or alumina.

The "relative refractive index profile," as used herein, is the relationship between the relative refractive index (defined below) and fiber radius of a radial cross section of the optical fiber.

"Relative refractive index," as used herein, is defined as:

$$\Delta_i(\%) = 100 \cdot [n_i^2 - n_r^2]/(2n_i^2)$$

where $n_i$ is the maximum refractive index in region i, unless otherwise specified, and $n_r$ is the reference refractive index, which is take to the that of pure silica glass unless otherwise specified. Accordingly, as used herein, the relative refractive index is relative to pure silica glass. The terms delta, delta index, delta index percent, Δ, Δ % are used interchangeably herein. The terms $\Delta_{iMAX}$ and $\Delta_{iMIN}$ respectively refer to the maximum relative refractive index and the minimum relative refractive index for the region i of the optical fiber.

The normalized refractive index is denoted N and is defined as $N = n_i - n_{ref}$, where $n_{ref}$ is the minimum refractive index of the profile.

The term "index profile" as used herein means a refractive index profile, a relative refractive index profile, a normalized refractive index profile or any other profile that is based on the refractive index.

The term "index parameter" is used to denote a parameter used to describe an index profile. For example, for a relative refractive index profile, the index parameter is Δ, the relative refractive index, while for a normalized refractive index profile, the index parameter is the normalized refractive index N.

It should be understood that the phrase "pure silica glass," as used herein, means that the region or layer of the optical fiber comprising "pure silica glass" does not contain material, such as dopants and/or other trace materials, in an amount which would significantly alter the refractive index of the silica glass region or portion. However, small amounts of dopants (e.g., chlorine and/or fluorine in an amount less than 1500 ppm of each) may be present in the region or portion of the fiber that is referred to as being "silica" or "pure silica."

"Chromatic dispersion" (which may be referred to herein as "dispersion" unless otherwise noted) of a waveguide fiber is the sum of the material dispersion and the waveguide dispersion. A zero dispersion wavelength is a wavelength at which the dispersion has a value of zero and also referred to herein as Lambda 0 or $\lambda_0$. Dispersion slope is the rate of change of dispersion with respect to wavelength.

The term "α-profile" (also referred to herein as alpha profile or just alpha) refers to a relative refractive index profile of the core region expressed in terms of $\Delta(r)$ which is in units of "%", where r is radius. Δr is represented as:

$$\Delta(r) = \Delta(r_0)\left[1 - \left[\frac{|r - r_0|}{(r_1 - r_0)}\right]^\alpha\right]$$

where $r_o$ is the point at which $\Delta(r)$ is maximum, $r_1$ is the point at which $\Delta(r)$ is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Petermann II method as based on the following equations:

$2w$=MFD, where $$w = \left[2\frac{\int_0^\infty (f(r))^2 r\,dr}{\int_0^\infty \left(\frac{df(r)}{dr}\right)^2 r\,dr}\right]^{1/2}$$

and f(r) is defined above.

The bend resistance of a waveguide fiber can be gauged by induced attenuation under prescribed test conditions. Mandrel wrap is a macrobending test, lateral load and pin array are microbending tests. Data in Table 1 includes values for both types of loss. The mandrel wrap test is one test used to determine macrobending loss (macro BL). In the mandrel wrap test, an optical fiber is wrapped around a mandrel having a prescribed diameter, e.g., the optical fiber is wrapped 1 turn around a 6 mm, 10 mm, 20 mm, 30 mm or other specified diameter mandrel (e.g. "1×10 mm diameter macrobend loss" or "1×30 mm diameter macrobend loss") and measuring the increase in attenuation per turn at a specified wavelength (typically within the range of 1200-1700 nm, e.g., 1310 nm or 1550 nm or 1625 nm).

One test for measuring microbending loss (micro BL) is the wire mesh drum test. In the wire mesh drum test, the attenuation of light at wavelengths of 1310 nm, 1550 nm, and 1625 nm through a coated fiber having a length of 750 m was determined at room temperature. The microbend induced attenuation was determined by the difference between a zero tension deployment and a high tension deployment on the wire mesh drum. Separate measurements were made for two winding configurations. In the first configuration, the fiber was wound in a zero tension configuration on an aluminum drum having a smooth surface and a diameter of approximately 400 mm. The zero-tension winding configuration provided a stress-free reference attenuation for light passing through the fiber. After sufficient dwell time, an initial attenuation measurement was performed. In the second winding configuration, the fiber sample was wound to an aluminum drum that was wrapped with fine wire mesh. For this deployment, the barrel surface of the aluminum drum was covered with wire mesh and the fiber was wrapped around the wire mesh. The mesh was wrapped tightly around the barrel without stretching and was kept intact without holes, dips, tearing, or damage. The wire mesh material used in the measurements was made from corrosion-resistant type 304 stainless steel woven wire cloth and had the following characteristics: mesh per linear inch: 165×165, wire diameter: 0.0019", width opening: 0.0041", and open area %: 44.0. A 750 m length of coated fiber was wound at 1 m/s on the wire mesh covered drum at 0.050 cm take-up pitch while applying 80 (+/−1) grams of tension. The ends of the fiber were taped to maintain tension and there were no fiber crossovers. The points of contact of the wound fiber with the mesh impart stress to the fiber and the attenuation of light through the wound fiber is a measure of stress-induced (microbending) losses of the fiber. The wire drum measurement was performed after a dwell time of 1-hour. The increase in fiber attenuation (in dB/km) in the measurement performed in the second configuration (wire mesh covered drum) relative to the first configuration (smooth drum) was determined for each wavelength. The average of three trials was determined at each wavelength and is reported as the wire mesh microbend loss of the coated fibers in Table 1.

By cabled cutoff wavelength, or "cabled cutoff" as used herein, we mean the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

Unless otherwise noted herein, optical properties (such as dispersion, dispersion slope, etc.) are reported for the LP01 mode.

The term "immediately surrounding" as used for example to describe region B immediately surrounding region A means that region B is in direct contact with region A.

The term "core cane" as used herein, refers to a doped silica cane used to make optical fiber. In some embodiments, the core cane has a doped central core region that is surrounded by a silica cladding. The core cane is consolidated glass.

The term "μm" as used herein refers to distance in microns.

The terms "low-index trench region" and "trench region" as used herein, refer to a portion of the optical preform or optical fiber that comprises an index-lowering dopant relative to pure silica. It should also be understood that the "lower index trench region" and "trench region," terms, as used herein, also include interim regions of the fiber or preform that contain doped soot that has not yet been consolidated, but will ultimately define a consolidated region containing the index-lowering dopant.

Dopant concentrations in the optical preform and/or fiber are expressed herein on the basis of weight (e.g., ppm by weight, ppm (by weight), percent by weight, wt. %), unless otherwise specified.

Concentrations of components in the gas phase are expressed herein on the basis of volume (e.g., ppm by volume, ppm (by volume), percent by volume, vol. %).

The terms "silica-based glass soot," "silica-based soot" and "soot" can be used interchangeably herein and refer to $SiO_2$ or doped-$SiO_2$ particles. It should also be understood that individual soot particles generally have a size of about 5 nm to about 10 microns in diameter and, in some embodiments, about 5 nm to about 1 micron in diameter.

The term "soot preform" refers to an article made of soot particles that has at least some open porosity.

The term "partially consolidated soot preform" refers to a soot preform that has been subjected to a consolidating step to partially close pores. As the extent of consolidation increases, pores become increasingly closed and pore volume progressively decreases.

The term "consolidated glass" refers to glass in a closed-pore state. In some embodiments, the glass is void-free.

The term "consolidating" refers to the step of going from a porous glass state to a closed-porosity state. In some embodiments, the glass becomes void-free in the consolidating step.

The terms "optical fiber preform," "consolidated preform," and "blank" refer to a glass article from which an optical fiber can be drawn. The terms "optical fiber preform(s)" and "optical fiber blank(s)" are used interchangeably.

Optical Fiber

Figure 1B:
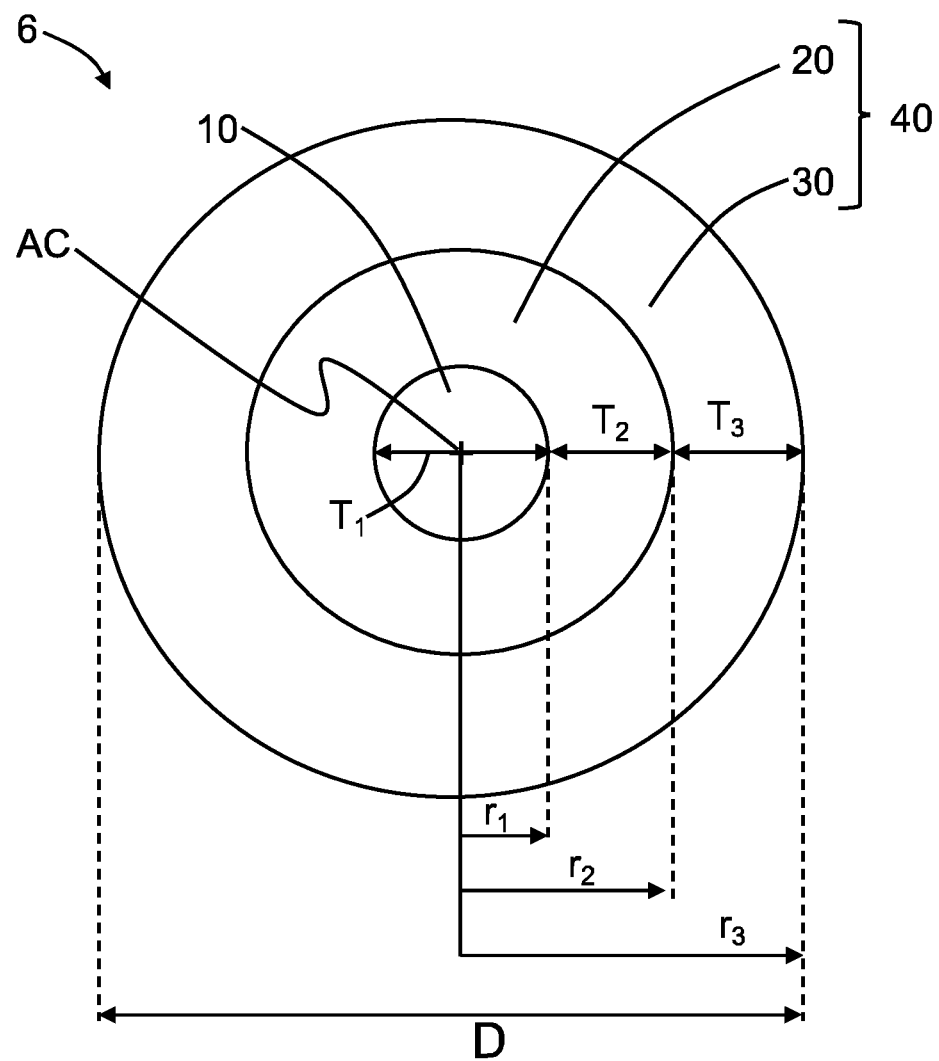

FIG. 1A is an isometric view and FIG. 1B is a schematic cross-sectional view of an example optical fiber 6 as disclosed herein. Embodiments of optical fibers 6 described herein generally comprise a single mode optical fiber having a core 10 centered on a central axis AC. The optical fiber 6 also has an inner cladding 20 (also referred to herein as an inner cladding layer) that immediately surrounds core 10, and an outer cladding 30 (also referred to as outer cladding layer) immediately surrounds the inner cladding. The inner cladding 20 and outer cladding 30 constitute a general cladding 40.

The core 10 (also referred to herein as a core layer and a core portion) has a relative refractive index $\Delta_1$ that varies with radial coordinate (radius) r and thus can be represented as $\Delta_1(r)$. The relative refractive index $\Delta_1$ includes a maximum relative refractive index $\Delta_{1MAX}$ (relative to pure silica) that in an example occurs at r=0 (see FIG. 2A, introduced and discussed below).

The core 10 has a radius $r_1$, which defines the inner radius of inner cladding 20. In an example, the core radius $r_1$ is in the range from 6 microns to 8 microns. The core 10 also has a thickness $T_1$ as measured from central axis AC, so that the core 10 has a diameter $d_1=2r_1=T_1$. The inner cladding 20 extends from radius $r_1$ to a radius $r_2$ such that the inner cladding has a radial thickness $T_2=r_2-r_1$. The outer cladding 30 extends from radius $r_2$ to a radius $r_3$ such that the outer cladding has a radial thickness $T_3=r_3-r_2$. The optical fiber 6 has an outer diameter $D=2r_3$. In an example, $r_3=62.5$ μm. In an example, thickness $T_2$ is in the range from 8 microns to 9 microns. In another example, radial thickness $T_3$ is in the range from 45 microns to 48 microns. The radii $r_1$, $r_2$ and $r_3$ are the outer radii of core 10, inner cladding 20 and outer cladding 30, respectively. In some embodiments $r_2$ is greater than 9 microns. In some embodiments $r_2$ is greater than or equal to 12 microns. In some embodiments $r_2$ is greater than or equal to 15 microns. In some embodiments $r_2$ is less than or equal to 25 microns. In some embodiments $r_2$ is greater than 9 microns and less than or equal to 25 microns.

Figure 2A:
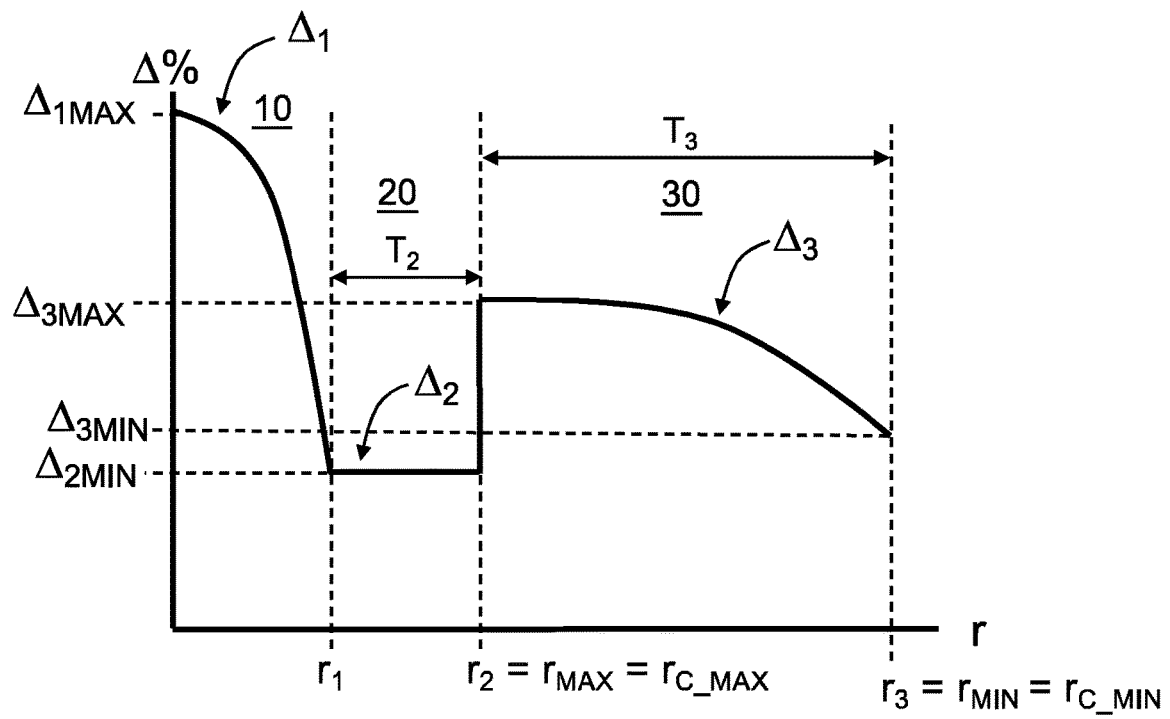
FIGS. 2A and 2B are idealized plots of the relative refractive index profile Δ % versus the radial coordinate r (arbitrary units) for an example optical fiber as disclosed herein.
Figure 2B:
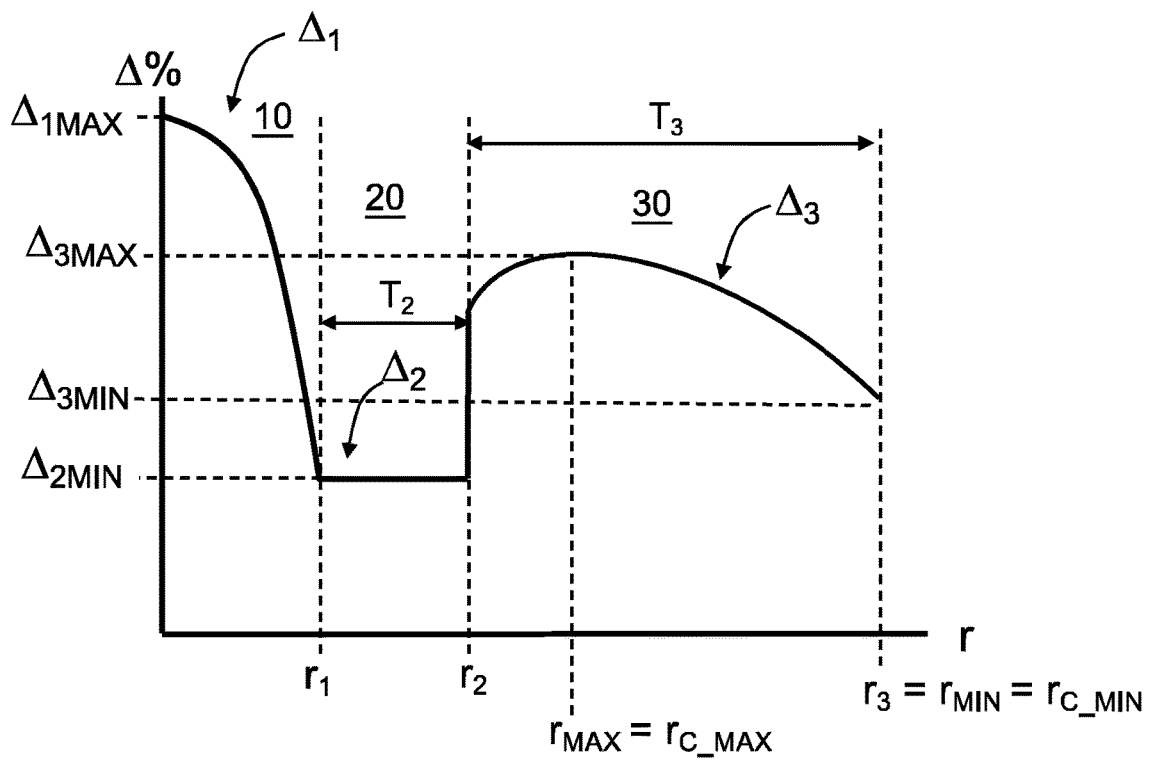

FIGS. 2A and 2B are idealized index profile plots that show the relative refractive index $\Delta$ % versus fiber radius r (μm) for examples of optical fiber 6. The plot is not to scale to highlight select features of the relative refractive index profiles.

The inner cladding 20 has a relative refractive index $\Delta_2$, wherein $\Delta_{1MAX}>\Delta_2$. The relative refractive index $\Delta_2$ can also vary with radius r and so can be represented as $\Delta_2(r)$. The relative refractive index $\Delta_2$ can also have maximum and minimum values $\Delta_{2MAX}$ and $\Delta_{2MIN}$, respectively. In an example, $\Delta_{2MIN}=0$, i.e., the calculation of the relative refractive index $\Delta$ is performed such that the lowest value of $\Delta$ is $\Delta_{2MIN}$.

The outer cladding 30 has a relative refractive index $\Delta_3$ that varies with radius r and thus can be represented as $\Delta_3(r)$. The relative refractive index $\Delta_3$ includes a maximum value $\Delta_{3MAX}$, wherein $\Delta_{1MAX}>\Delta_{3MAX}>\Delta_2$. In an example, $\Delta_{3MAX}$ occurs at $r=r_2$. In an example, the relative refractive index $\Delta_3$ of outer cladding 30 includes a minimum value $\Delta_{3MIN}$. Further in example, the minimum value $\Delta_{3MIN}$ occurs at $r=r_3$. In some embodiments $\Delta_{3MAX}-\Delta_{3MIN}\geq 0.01$ $\Delta$ %. In some embodiments $\Delta_{3MAX}-\Delta_{3MIN}\geq 0.03$ $\Delta$ %. In some embodiments $\Delta_{3MAX}-\Delta_{3MIN}\geq 0.05$ $\Delta$ %. In some embodiments $\Delta_{3MAX}-\Delta_{3MIN}\geq 0.08$ $\Delta$ %.

The core 10, inner cladding 20 and outer cladding 30 may comprise dopants, as described in more detail herein. The cross section of the optical fiber 6 may be generally circular-symmetric with respect to central axis AC.

In some embodiments, the graded index core 10 has a core alpha that is less than 10, in some embodiments, the graded index core 10 has a core alpha that is less than 5, and in some embodiments, the graded index core 10 has a core alpha that is less than 3. In some embodiments, the graded index core 10 has a core alpha that is less than 3 and greater than 1. In some embodiments, the graded index core 10 has a core alpha that is less than 2.5 and greater than 1.5. The difference between the relative refractive index $\Delta_{3MAX}$ of outer cladding 30 and that of inner cladding 20 is $\Delta_3-\Delta_2$ and is preferably positive and is greater than 0.005 $\Delta$ %, or more preferably is greater than or equal to 0.015 $\Delta$ % or even more preferably is greater than or equal to 0.025%. In an example, $\Delta_3-\Delta_2$ is defined as $\Delta_{3MAX}-\Delta_{2MIN}$, wherein $\Delta_{2MIN}$ is zero.

The profiles of FIGS. 2A and 2B show the curved shape of relative refractive index $\Delta_3$ of outer cladding 30. In FIG. 2A, the maximum value $\Delta_{3MAX}$ occurs at $r=r_2=r_{MAX}$ and the minimum value $\Delta_{3MIN}$ occurs at $r=r_3=r_{MIN}$. In FIG. 2B, the maximum value $\Delta_{3MAX}$ occurs at $r=r_{MAX}$ where $r_2<r_{MAX}<r_3$, while the minimum value $\Delta_{3MIN}$ occurs at $r=r_3=r_{MIN}$. In an example, $r_{MIN}>r_{MAX}$.

In the idealized plots of FIGS. 2A and 2B, $\Delta_2$ has a constant value, though as noted above $\Delta_2$ can also vary with radial coordinate r, and in practice for actual fabricated optical fibers 6, $\Delta_2$ may vary with radial coordinate due to manufacturing effects.

Table 1 below sets forth example parameters for three example optical fibers 6 denoted EX 0, EX 1 and EX 2, which have relative refractive index profiles P0, P1, and P2 shown in FIGS. 3A-3C, respectively. In Table 1, "BL" stands for "bend loss." The macro BL data was obtained using the mandrel wrap test described above and the micro BL data were obtained using the wire mesh drum test described above. "$C_{max}$" and "$C_{min}$" stands for "maximum chlorine concentration" and "minimum chlorine concentration", respectively.

TABLE 1

| Parameter | EX 0 | EX 1 | EX 2 |
| --- | --- | --- | --- |
| $r_1$ (μm) | 6.845 | 6.845 | 6.845 |
| $r_2$ (μm) | 15.36 | 15.36 | 15.36 |
| $r_3$ (μm) | 62.5 | 62.5 | 62.5 |
| Alpha value | 2.2 | 2.2 | 2.2 |
| $\Delta_{1MAX}$ | 0.397 | 0.397 | 0.397 |
| $\Delta_{2MIN}$ | 0 | 0 | 0 |
| $\Delta_{3MAX}$ | 0.0323 | 0.0313 | 0.031 |
| $\Delta_{3MIN}$ | 0.022 | 0.014 | 0.01 |
| $\Delta_{3MAX} - \Delta_{3MIN}$ | 0.0103 | 0.0173 | 0.021 |
| MFD @1310 nm (μm) | 9.2 | 9.2 | 9.2 |
| $\lambda_0$ (nm) | 1312 | 1312 | 1312 |
| Cabled Cutoff (nm) | 1200 | 1200 | 1200 |
| $C_{MAX}$ (ppm) | 4366 | 4265 | 4235 |

TABLE 1-continued

| Parameter | EX 0 | EX 1 | EX 2 |
|---|---|---|---|
| $C_{MIN}$ (ppm) | 3326 | 2518 | 2114 |
| 20 mm macro BL (dB/turn) at 1550 nm | 0.15 | 0.138 | 0.141 |
| 30 mm macro BL (dB/turn) at 1550 nm | 0.004 | 0.0035 | 0.0037 |
| Micro BL (dB/km) at 1550 nm | 0.025 | 0.019 | 0.02 |
| Attenuation (dB/km) at 1550 nm | 0.182 | 0.182 | 0.182 |

Figure 3A:
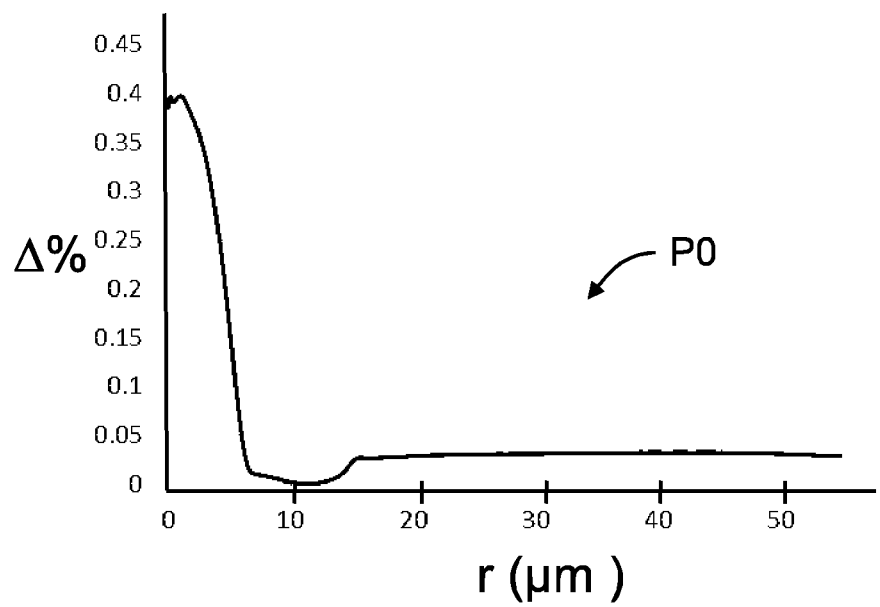
FIGS. 3A through 3C are plots of the relative refractive index profile Δ % versus the radial coordinate r (μm) for example profiles P0, P1 and P2, respectively.
Figure 3B:
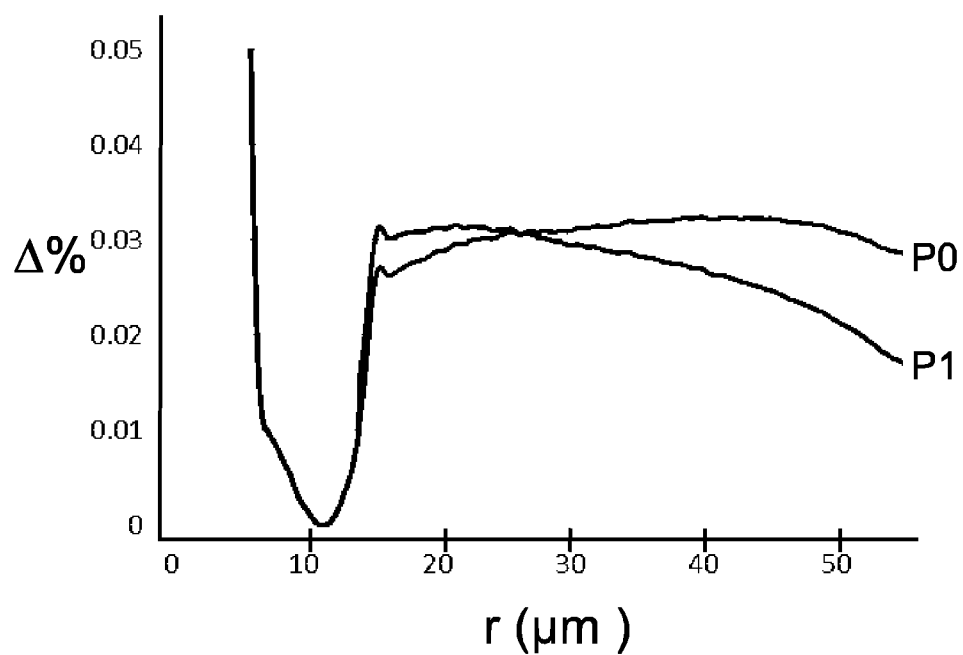
Figure 3C:
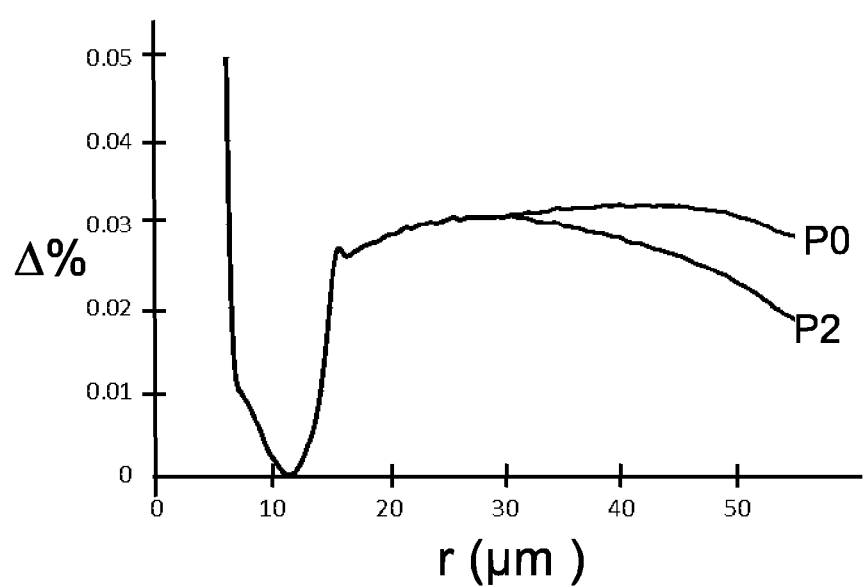
Figure 4A:
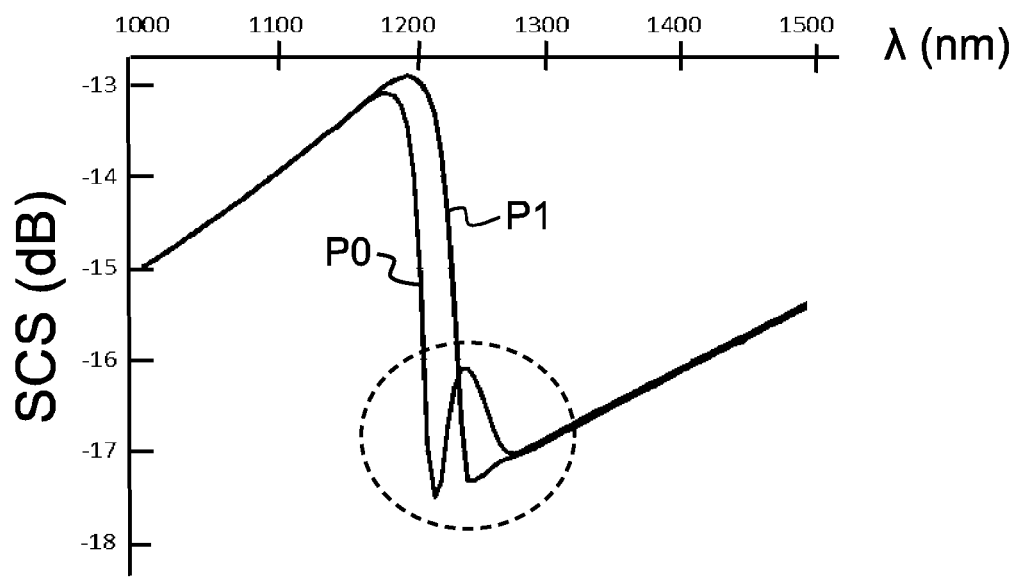
FIGS. 4A and 4B are plots of the simulated cutoff signal SCS (dB) versus wavelength λ (nm) that show modeled cutoff traces for the baseline profile P0 as well as for profile P1 (FIG. 4A) and profile P2 (FIG. 4B)
Figure 4B:
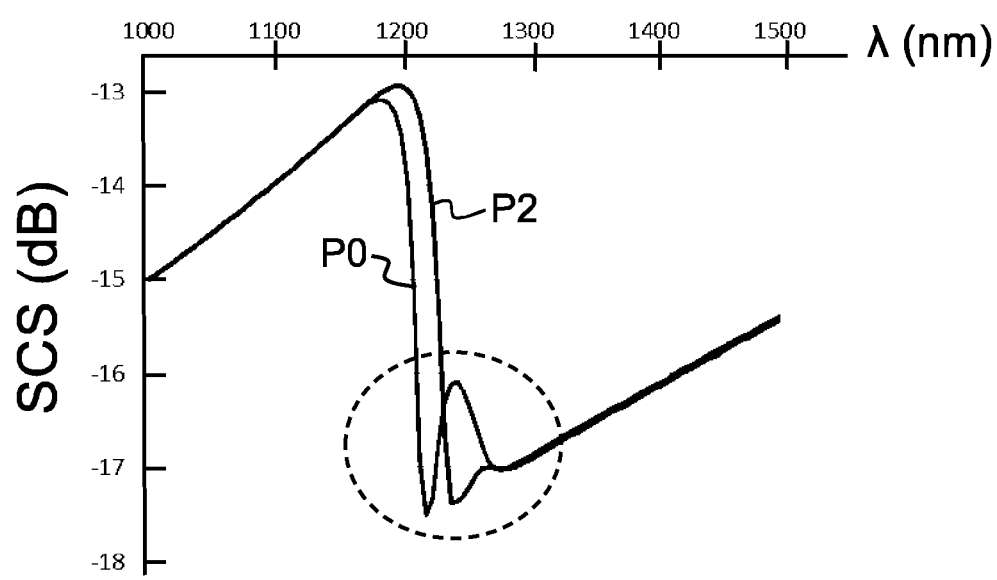

FIG. 3A is a plot of Δ % versus fiber radius r (μm) for an example baseline profile (P0) for example optical fiber EX 0. FIGS. 3B and 3C are similar plots to FIG. 3A and include baseline profile P0 and respective additional profiles P1 and P2 for example optical fibers EX 1 and EX 2, wherein the Δ % axis is amplified to show the detail of the shape of the profile for outer cladding 30. FIGS. 4A and 4B are plots of the simulated cutoff signal SCS (dB) versus wavelength (nm) that show modeled cutoff traces for baseline profile P0 as well as for profile P1 (FIG. 4A) and profile P2 (FIG. 4B). The plots of FIGS. 4A and 4B show that the bump in the SCS signal for baseline profile P0 is significantly reduced in profiles P1 and P2. The presence of the bump in the SCS signal is undesirable because it leads to errors in the determination of the cutoff wavelength and makes it difficult to use MAC number (ratio of mode field diameter to cutoff wavelength) as a predictor of bend loss.

Chlorine Concentration

Optical fiber 6 can be fabricated such that the varying relative refractive index $\Delta_3$ of outer cladding 30 is defined by a chlorine concentration C that varies with radial coordinate r, i.e., C=C(r). The chlorine concentration C(r) thus has a gradient concentration profile with a maximum value $C_{MAX}$ and a minimum concentration $C_{MIN}$. In an example, the maximum chlorine concentration $C_{MAX}$ is at $r=r_{C\_MAX}=r_2$, i.e., at the inside portion (surface) of outer cladding 30 and the minimum chlorine concentration $C_{MIN}$ is at $r=r_{C\_MIN}=r_3$, i.e., at the outer portion (surface) of the outer cladding (FIG. 2A). In another example, $r_{C\_MAX}$ is between $r_2$ and $r_2+T_3/2$ (FIG. 2B). In another example, $r_{C\_MAX}$ is between $r_2+T_3/2$ and $r_3$.

In an example where $r_3$=62.5 microns, the maximum chlorine concentration $C_{MAX}$ is at a radial coordinate $r_{C\_MAX}$ between $r_2$ and 40 microns and the minimum chlorine concentration $C_{MIN}$ at a radial coordinate $r_{C\_MIN}$ between r=40 microns and $r_3$.

In an example, $C_{MAX}$ is at least 1000 ppm greater than $C_{MIN}$. In another example, $C_{MAX}$ is at least 1500 parts per million (ppm) greater than $C_{MIN}$. In another example, $C_{MAX}$ is at least 1700 parts per million (ppm) greater than $C_{MIN}$. In another example, $C_{MAX}$ is at least 2,000 ppm greater than $C_{MIN}$.

In an example, optical fiber 6 has an attenuation of less than 0.185 dB/km at a wavelength of 1550 nm. Also in an example, optical fiber 6 has a macro bend loss for a 20 mm diameter mandrel of less than 0.2 dB/turn at a wavelength of 1550 nm. Also in an example, optical fiber 6 has a zero dispersion wavelength $\lambda_0$, wherein 1300 nm≤$\lambda_0$≤1324 nm. In another example, optical fiber 6 has an MFD at a wavelength of 1310 nm between 8.8 microns and 9.5 microns. In another example, optical fiber 6 has a cabled cutoff of less than or equal to 1260 nm. The optical fiber 6 can have one or more of the above-identified characteristics, including all of the above-identified characteristics.

In one embodiment, the invention comprises a method of forming an optical fiber having core and a cladding, comprising: a) performing an overclad laydown process on a core cane to create a silica soot preform having a soot overclad layer disposed around the core cane, wherein the silica soot perform has a tailored radial soot density profile; b) doping the soot overclad layer with chlorine using an overclad consolidation process to form a doped and partially consolidated silica soot preform; c) consolidating the doped and partially consolidated silica soot preform to form a void-free chlorine doped and consolidated glass preform; and d) drawing the void-free chlorine doped and consolidated glass preform to form the optical fiber.

The term "tailored radial soot density profile" refers herein to a predetermined radial density profile of silica or doped silica soot that corresponds to the soot portion of an optical preform.

In one embodiment, the invention further comprises removing a portion of the chlorine from an outermost region soot overclad layer of the doped and partially consolidated silica soot preform to define a radially varying chlorine concentration in the soot overclad layer.

In one embodiment, the invention further comprises, wherein said removing is accomplished by exposing the outermost region of the soot overclad layer to at least one of oxygen and water.

In one embodiment, the invention further comprises, wherein said removing is accomplished by exposing the outermost region of the soot overclad layer to a dry atmosphere having at least one of helium, nitrogen and argon.

In one embodiment, the invention further comprises, wherein the act b) of doping with chlorine comprises exposing the soot overclad layer to at least one of $Cl_2$ and $SiCl_4$.

In one embodiment, the invention further comprises wherein the act b) of doping with chlorine comprises exposing the soot overclad layer to carbon monoxide.

Fabrication Methods

Figure 5:
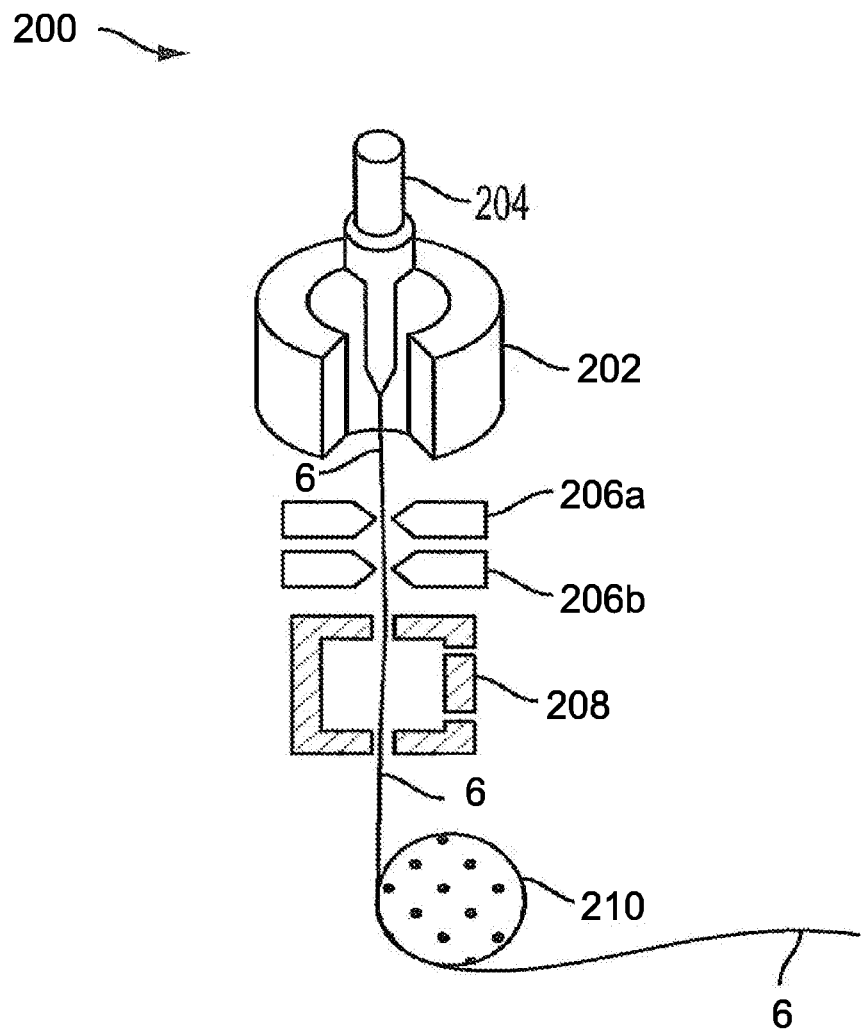
FIG. 5 is a schematic of an example system for drawing an optical fiber according to one or more embodiments shown and described herein.

The optical fiber 6 disclosed herein can be formed using a drawing process. FIG. 5 is a schematic diagram of an example drawing system 200 for producing optical fiber 6 as disclosed herein. The system 200 may comprise a draw furnace 202 for heating a glass optical fiber preform ("glass preform") 204 such that an optical fiber 100 may be drawn from the glass preform. The glass preform 204 may be produced by an outside vapor deposition (OVD) method and may be formed as discussed below. The configuration of glass preform 204 and the various drawing parameters (draw speed, temperature, tension, cooling rate, etc.) dictate the final form of optical fiber 6. Example techniques for forming glass preform 204 are described in U.S. Pat. Nos. 9,108,876 and 9,290,405 and U.S. Pre-Grant Publication No. 2003/0079504, which are incorporated by reference herein. The draw furnace 202 may be oriented such that an optical fiber 6 drawn from the glass preform 204 exits the furnace along a substantially vertical pathway.

After the optical fiber 6 exits the draw furnace 202, the diameter of the optical fiber and the draw tension applied to the optical fiber 6 may be measured using non-contact sensors 206a and 206b. Tension may be applied to the optical fiber 6 by any suitable tension-applying mechanism 210.

After the diameter and tension of the optical fiber 6 are measured, the optical fiber may be passed through a cooling mechanism 208 that provides slow cooling of the optical fiber. The cooling mechanism 208 may be any mechanism for cooling an optical fiber as may be presently known in the art or subsequently developed. In one embodiment, the cooling mechanism 208 is filled with a gas that facilitates cooling of the optical fiber at a rate slower than cooling the optical fiber in air at ambient temperatures.

An example type of glass preform 204 is formed from silica soot and then consolidated, as described in for example U.S. Pat. Nos. 4,906,268 and 5,656,057, which are incorporated by reference herein. An example process for increasing the relative refractive index $\Delta_3$ of outer cladding 30 includes updoping a silica soot preform with chlorine during the consolidation step. Chlorine can be incorporated into the silica matrix using chlorine gas ($Cl_2$) or preferably silicon tetrachloride ($SiCl_4$) vapor as a precursor. This doping technique is called "flood doping" (see, e.g., U.S. Pat. No. 4,629,485, which is incorporated by reference herein) and the level of chlorine incorporation is highly dependent on temperature, precursor concentration, and soot porosity or density. This and other processes for forming glass preform 204 to have a select chlorine dopant profile are discussed in greater detail below.

Figure 6:
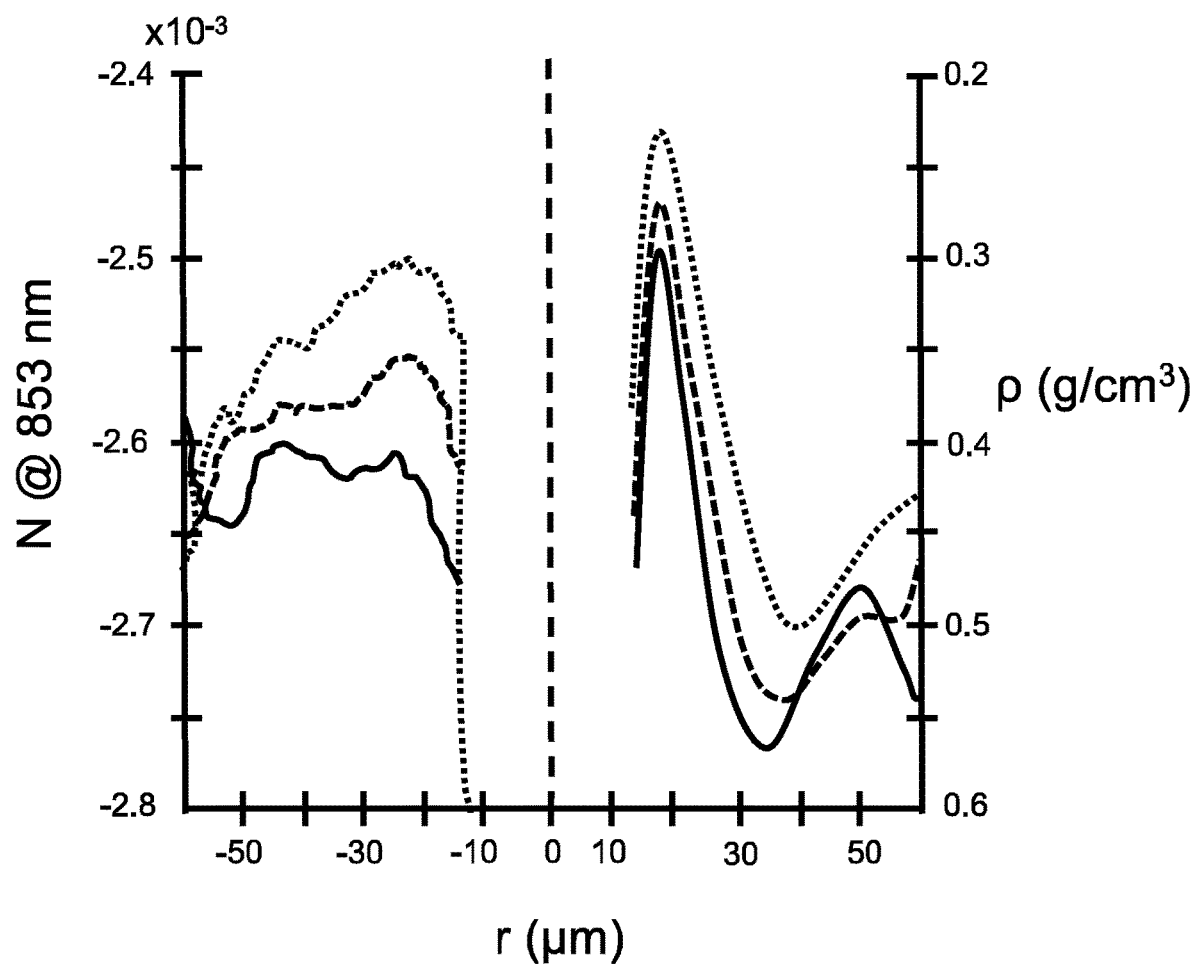
FIG. 6 plots on the left vertical axis the normalized relative refractive index N of the outer cladding and on the right vertical axis the annular soot density ρ (g/cm$^3$) for a fiber preform, with the horizontal axis being the fiber radius r (μm)

Three additional example fibers were prepared and are identified herein as "Experiment 1", "Experiment 2", and "Experiment 3". FIG. 6 plots on the left vertical axis the normalized refractive index N of outer cladding 30 of example optical fibers Experiment 1 (dotted line), Experiment 2 (dashed line), and Experiment 3 (solid line). The right vertical axis of FIG. 6 shows the annular soot density $\rho$ (g/cm$^3$) for the soot preforms used to form example optical fibers Experiment 1, Experiment 2, and Experiment 3. Separate preforms were used to make example optical fibers Experiment 1, Experiment 2, and Experiment 3. The annular soot density $\rho$ shown in FIG. 6 corresponds to the soot density at the time of doping of each preform. After doping, the separate preforms were sintered under identical conditions to form densified preforms. Optical fibers were drawn from each of the densified preforms. The horizontal axis of FIG. 6 is the fiber radius r ($\mu$m), which is measured relative to the fiber centerline (r=0). The plot of FIG. 6 shows how the profiles for the normalized refractive index N for outer cladding 30 depends on the soot density profile of the preform used to make the optical fiber.

Figure 7:
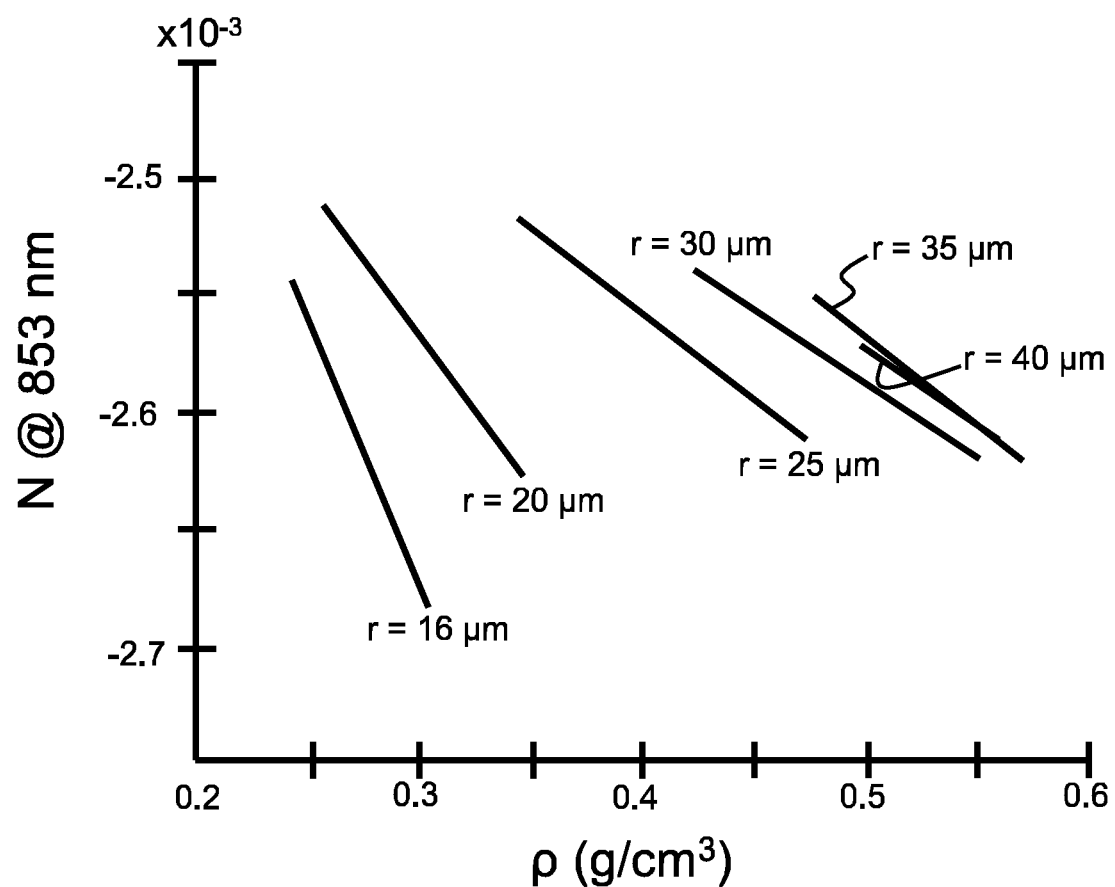
FIG. 7 is a plot of the best-fit lines of measured data for the normalized refractive index N @ 853 nm versus the soot density ρ (g/cm$^3$) for different fiber radii r (μm)

The plot of FIG. 6 shows that higher soot densities $\rho$ that have lower porosities and incorporate less chlorine result in a lower relative refractive index $\Delta$. Lower soot densities $\rho$ show the opposite behavior. These data can be transformed to show the dependence of the outer cladding relative refractive index $\Delta_3$ on the soot density $\rho$. For example, FIG. 7 plots the normalized refractive index N @ 853 nm versus the soot density $\rho$ (g/cm$^3$) for different fiber radii r ($\mu$m). Table 2 below shows the best-fit line parameters slope S, y-intercept Y-INT and $R^2$ value associated with each best-fit line for the radius values of r=16 $\mu$m, 20 $\mu$m, 25 $\mu$m and 30 $\mu$m of FIG. 7.

TABLE 2

| r | S × 10$^{-3}$ (cm$^3$/g) | (Y-INT) × 10$^{-3}$ | $R^2$ |
|---|---|---|---|
| 16 $\mu$m | −2.358 | −1.968 | 0.806 |
| 20 $\mu$m | −1.279 | −2.185 | 0.828 |
| 25 $\mu$m | −0.7357 | −2.263 | 0.593 |
| 30 $\mu$m | −0.6325 | 02.270 | 0.466 |

Figure 8:
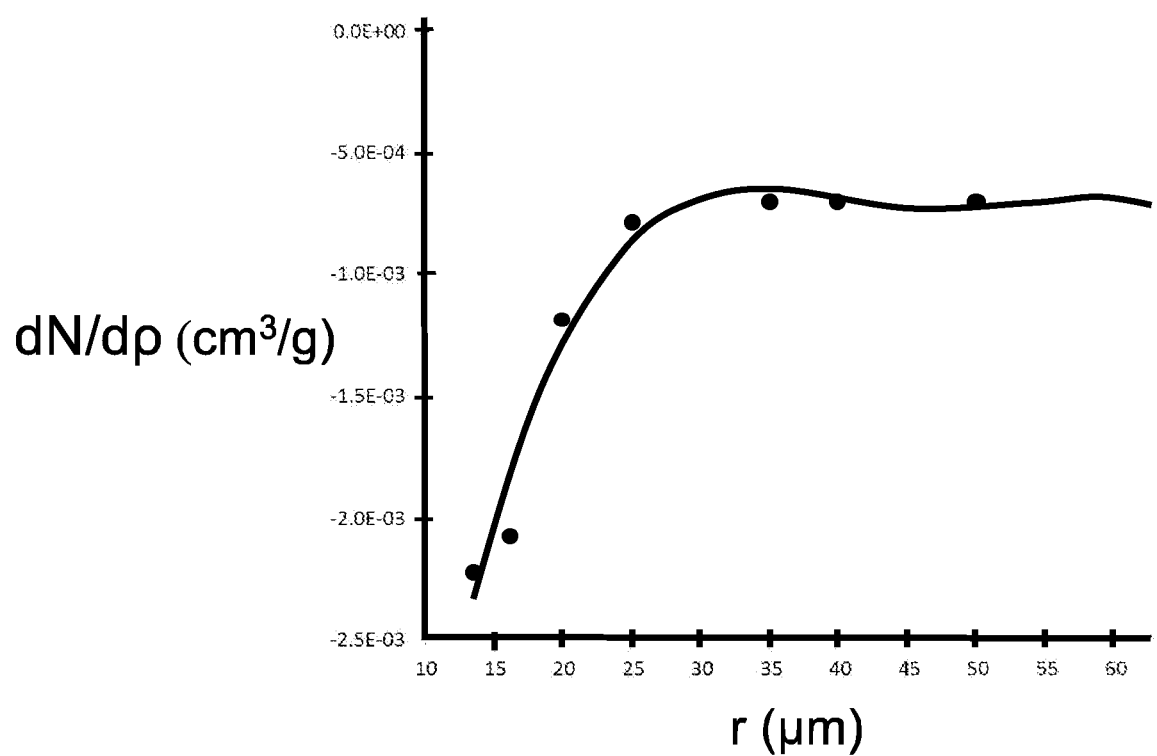
FIG. 8 is a plot of the normalized refractive index sensitivity (dN/dρ) as a function of fiber radius r (μm)

FIG. 8 plots the normalized refractive index sensitivity N to the soot density $\rho$ (i.e., dN/d$\rho$) in units of cm$^3$/g as a function of fiber radius r ($\mu$m) from the slope data presented in FIG. 7, Table 2 and similar data not included in FIG. 7 or Table 2. The quantity dN/d$\rho$ is referred to hereinafter as the "N sensitivity." It is noted that a corresponding quantity d$\Delta$/d$\rho$, i.e., the "$\Delta$ sensitivity" can also be employed. More generally, any form of index plots can be used along with the corresponding index sensitivity, and relative refractive index $\Delta$ and normalized refractive index N are cited herein by way of example.

Method of Forming Soot Preform

Knowing the index profile sensitivity, such as the $\Delta$ sensitivity or the N sensitivity, soot preforms can be formed that are "tuned" to incorporate the correct amount of chlorine to achieve a select (reference) index profile, e.g., a relative refractive index profile $\Delta$ % (r) (or an N profile, etc.) such as one of the profiles P1 and P2 described above. Thus, in an example, near matches to the reference profile can be identified in a set of existing fibers and the error (i.e., differences in the profiles) can be determined.

Figure 9:
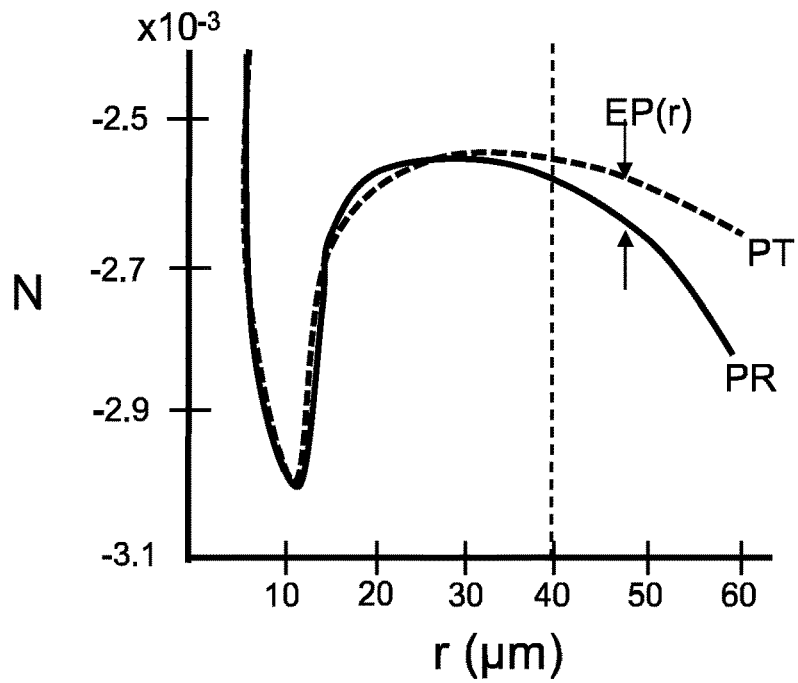
FIG. 9 is a plot of the normalized relative refractive index N @ 853 nm versus fiber radius r (μm) for a reference optical fiber (PR) as compared to a test optical fiber (PT) to determine the profile match of the test optical fiber to the reference optical fiber in the process of forming optical fibers that substantially match the profile of the reference optical fiber.

FIG. 9 is an index plot that shows by way of example the normalized refractive index N versus radius r ($\mu$m) for a reference profile PR (solid curve) and an example test fiber having a test profile PT (dashed-line curve). The test fiber has too high a cladding normalized refractive index $N_3$ as compared to the reference profile PR beyond approximately the r=40 m fiber radius. The profile fit error $EP(r)=N_{PT}(r)-N_{PR}(r)$ is divided by the N sensitivity (dN/d$\rho$) at each fiber radius r to calculate a soot density error $\varepsilon_\rho$ in the original (non-consolidated) preform used to create the test fiber PT. It is emphasized that FIG. 9 can also be plotted using the relative refractive index $\Delta$ and the $\Delta$ sensitivity or any other index profile and corresponding index sensitivity to calculate the soot density error $\varepsilon_\rho$.

Figure 10:
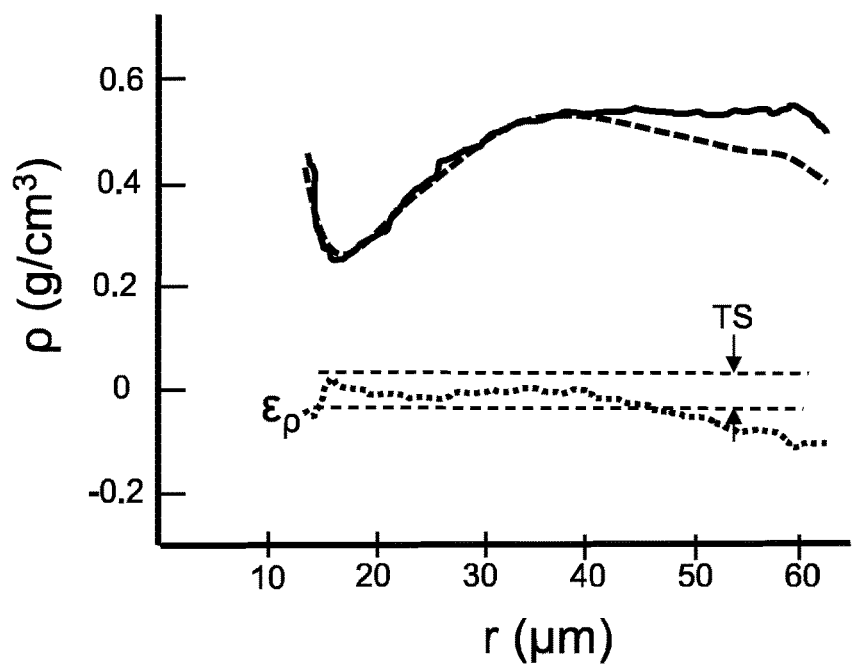
FIG. 10 plots the soot density ρ (g/cm$^3$) as a function of fiber radius r (μm), and shows the original annular soot density profile (solid line), the corrected annular soot density profile (dashed line) and the soot density error $\varepsilon_\rho$ (dotted line)

The soot density error $\varepsilon_\rho$ is then subtracted from the soot density profile of the original preform to provide a target soot density profile for forming a new preform to produce fibers that have the desired index profile, i.e., one sufficiently close to the reference profile PR (e.g., to within a tolerance TP on the measured profile error EP(r), i.e., EP(r)<TP). FIG. 10 plots the soot density $\rho$ (g/cm$^3$) as a function of fiber radius r ($\mu$m), and shows the annular soot density profile of the original preform (solid line), a corrected annular soot density profile designed to provide a fiber having reference profile PR (dashed line) and the soot density error, between the original and corrected preforms (dotted line). A tolerance TS on the soot density error, is also shown as two parallel dashed lines.

In one embodiment of the above method, the act a) of forming the soot overclad layer includes: i) comparing a relative refractive index profile of a test optical fiber formed from a preform that has a first soot overclad layer with an annular soot density profile to a reference optical fiber that has a desired relative refractive index profile to determine a profile fit error; ii) dividing the profile fit error by a sensitivity of the relative refractive index to a soot density to define a soot density error; iii) subtracting the soot density error from the annular soot density profile to define a modified annular soot density profile; and iv) forming the soot overclad layer using the modified soot density profile to form the silica soot preform.

In one embodiment, the method further includes an additional step or act v) of forming another test optical fiber using the silica soot preform formed by acts i)-iv) and then repeating acts i) through v) until the soot density error falls below a soot density error tolerance value.

First Example Process

Figure 11:
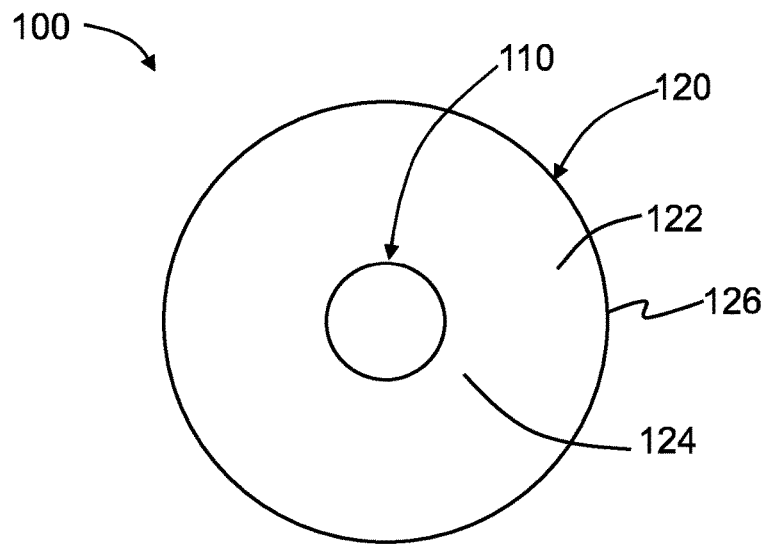
FIG. 11 shows a cross-sectional view of an example silica soot preform that includes a core cane and a soot overclad surrounding the core cane.

Once the target soot density profile for the soot preform is known, an overclad laydown process is performed on a core cane to form a soot-overclad preform or "silica soot preform." FIG. 11 shows a cross-sectional view of an example silica soot preform 100 that includes a core cane 110 and a soot overclad 120 that includes an outermost region 122 that resides adjacent an outer surface 126 and in innermost region 124 that resides adjacent the core cane.

The overclad laydown process includes a number of variables such as precursor flow rates, preform surface speed, and burner-to-preform surface distance that can be adjusted to produce preforms with the required target soot density profiles. Experiments show that the soot density ρ is primarily a function of preform surface temperature during deposition, where a higher temperature yields higher density and a lower temperature produces a lower density. For the purposes of tuning the soot density ρ for updoping, it is estimated that a surface temperature control range of +/−300° C. from the nominal temperature is desirable.

The surface temperature of the silica soot preform 100 can be controlled during the overclad laydown process using one or more process variables, including the process gases and flows used in the overclad laydown recipe, lathe airflow, and lathe motion control variables. The lathe motion control variables include Burner-to-Bait distance, Spindle Speed, and burner traverse speed.

Second Example Process

Figure 12:
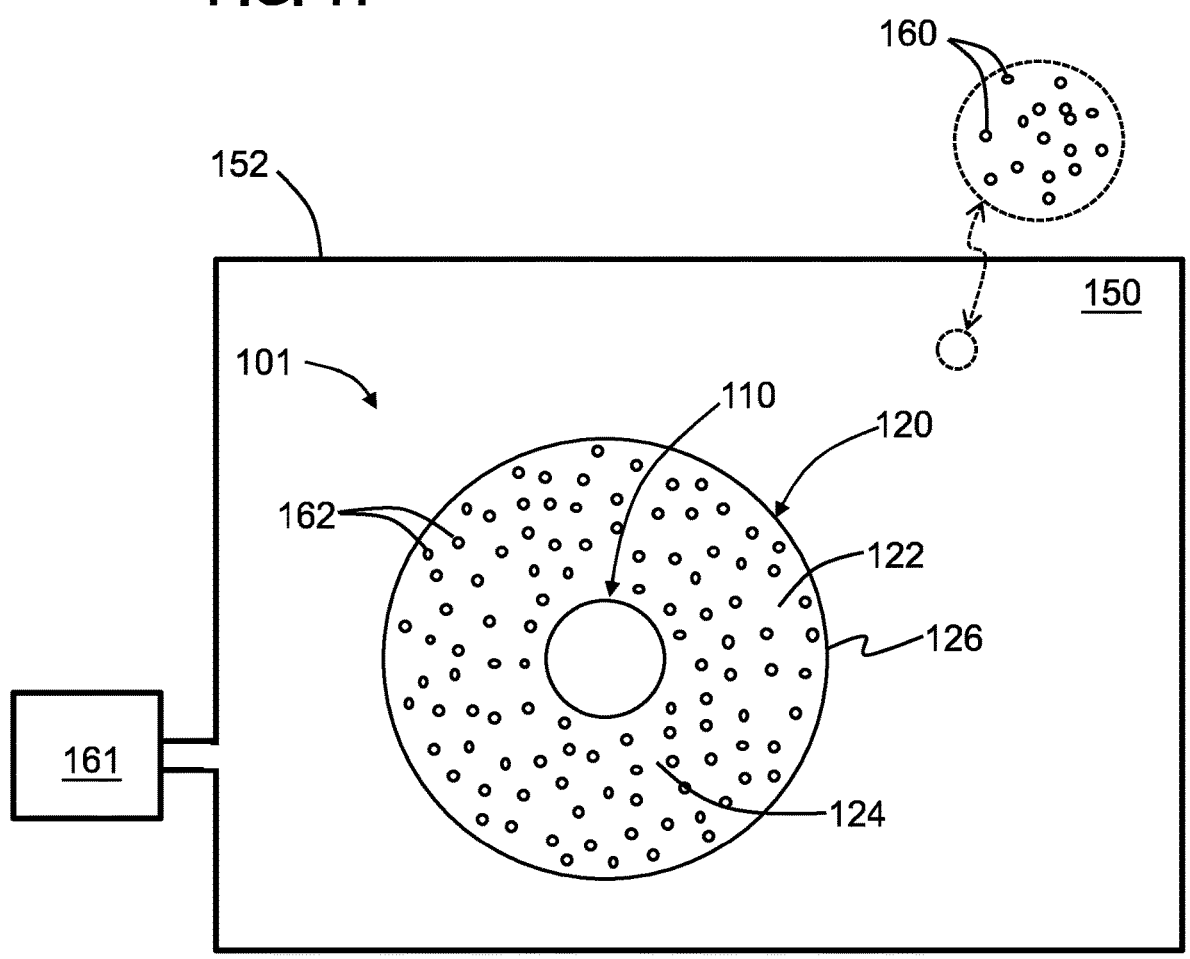
FIG. 12 shows the formation of a doped and partially consolidated soot preform in a consolidation furnace.

In a second example process illustrated in FIG. 12, the silica soot preform 100 of FIG. 11 can be arranged in an interior 150 of a consolidation furnace 152. The soot overclad 120 is exposed to at least one chlorine-containing substance 160 provide by a gas source 161 so that the soot overclad becomes doped with chlorine 162 to form a doped and consolidated silica soot preform 101. In an example, a non-chlorine-containing gas such as carbon monoxide is included in the furnace during the doping process, i.e., is present in the atmosphere surrounding soot overclad 120 during chlorine doping to facilitate the doping process. In an example, the at least one chlorine-containing substance 160 includes $Cl_2$ or $SiCl_4$.

Figure 13:
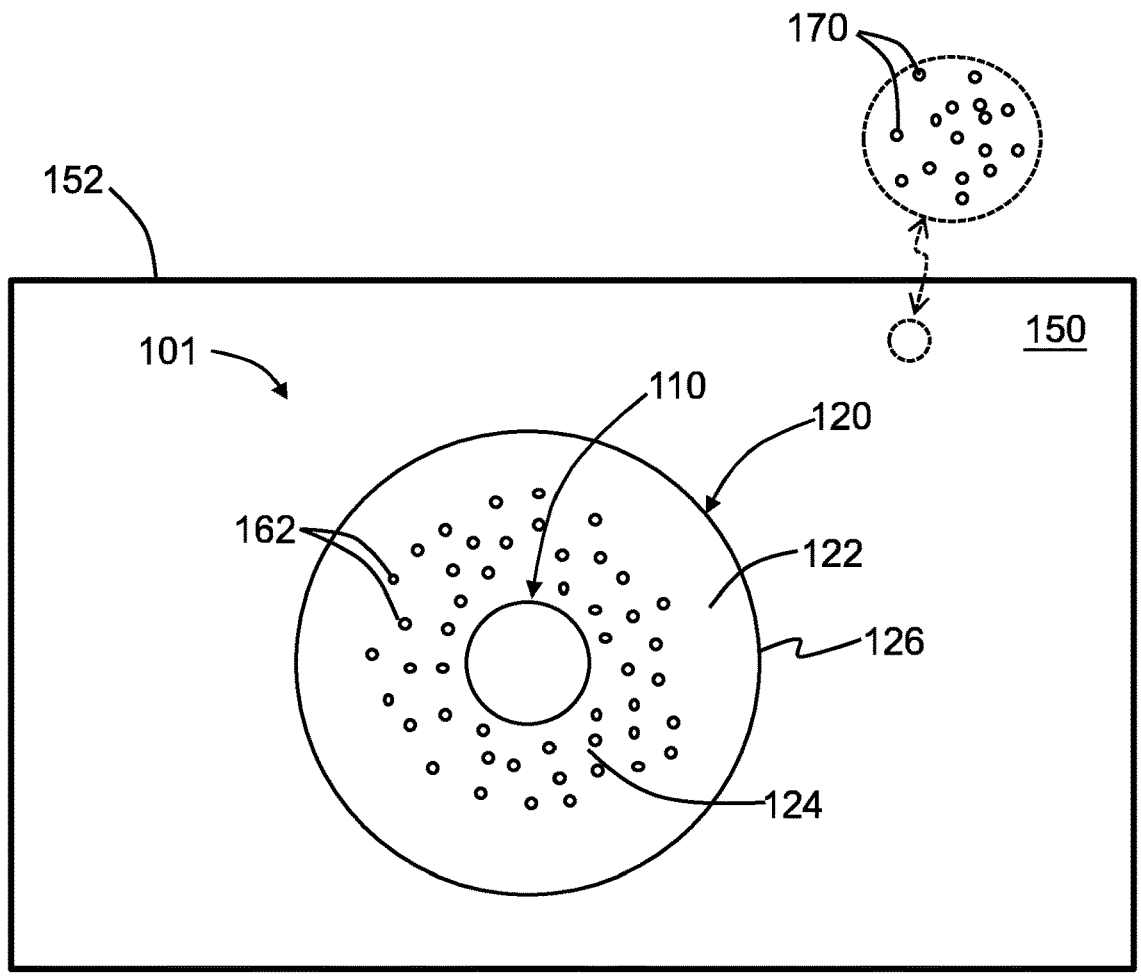
FIG. 13 is similar to FIG. 12 and shows how the chlorine dopant profile of the doped and partially consolidated soot preform is modified to be reduced in an outermost region of the soot overcladding as compared to an innermost region.

A portion of the chlorine 162 that resides within soot overclad 120 can then be removed from outer portion 122 of the soot overclad, as shown in FIG. 13. In an example, this is accomplished by sweeping a gas 170 through the furnace interior 150, wherein in one example the gas 170 contains a small amount of oxygen and/or water. The result is a doped and partially consolidated silica soot preform 101 with the modified Cl doping profile that has a radially varying Cl concentration as described above.

Figure 14:
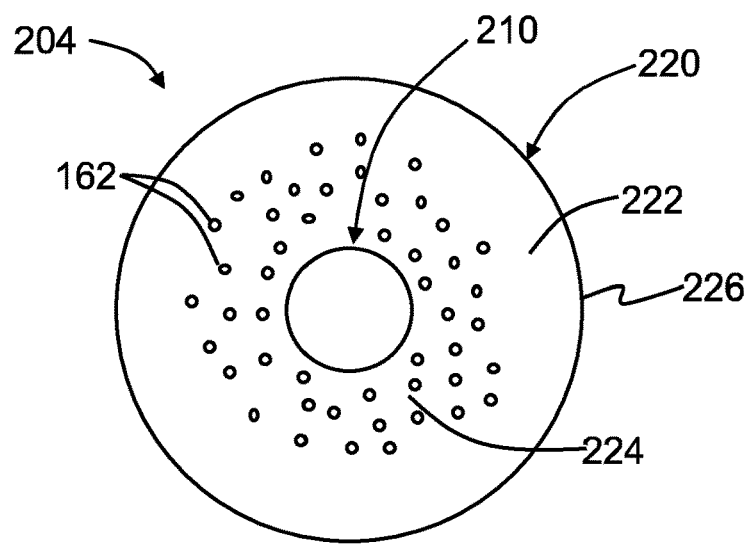
FIG. 14 shows an optical fiber preform that is formed from the doped and partially consolidated soot preform and that has a chlorine dopant profile that corresponds to the chlorine dopant profile of the doped and consolidated soot preform of FIG. 13.

The modified preform 101 is then further consolidated to form a void-free doped and consolidated glass preform 204 as shown in FIG. 14 and as discussed above in connection with FIG. 5. The glass preform 204 has a glass core 210 and a glass overclad 220 with an outermost region 222 adjacent an outer surface 226 and an innermost region 224 adjacent the glass core. The glass preform 204 has a radial chlorine concentration profile C(r) that is lower in chlorine concentration in the outermost region 222 of the glass overclad 220 as compared to the innermost region 224 of the glass overclad.

Third Example Process

In a third example process, the soot-overclad preform 100 can be chlorine doped in a consolidation furnace as described above to form doped and partially consolidated silica soot preform 101. In an example, the chlorine-containing substance 160 includes at least one of $Cl_2$ and $SiCl_4$. The source 161 of the chlorine-containing substance 160 is then turned off. The chlorine 162 can be removed from the outermost region of the doped and partially consolidated silica soot preform 101 by sweeping gas 170 through the furnace interior and past the doped and partially consolidated silica soot preform, wherein in an example the gas 170 contains at least one of dry helium, nitrogen and argon. The chlorine-doped silica soot particles, especially in the outermost region 122 of soot overclad 120, lose chlorine via Cl migration on the silica particles to form $SiCl_4$ gas, which is swept out of the interior 150 of furnace 152.

The resulting modified doped and partially consolidated silica soot preform 101 is then further consolidated as described above to form the void-free doped and consolidated glass preform 204 of FIG. 14. The glass preform 204 has a radial chlorine concentration profile C(r) having a lower chlorine concentration in the outermost region 222 of the glass overclad 220 as compared to the innermost region 222 of the glass overclad.

Combinations of the first, second and third processes can be used to achieve the desired chlorine profile in glass preform 200 used to form optical fibers 6 as disclosed herein.

The form of relative refractive index $\Delta_3$ for outer cladding 30 reduces excess stress in core 10 and inner cladding 20, which helps in lowering fiber attenuation. The profile for relative refractive index $\Delta_3$ for outer cladding 30 also lowers macrobend and microbend loss by about 5 to 10% as compared to conventional profiles. The optical fiber 6 made with this method exhibits attenuation at 1550 nm that is less than 0.185 dB/km and a bend loss at 1550 nm for a 20 mm mandrel diameter that is less than 0.5 dB/turn.

The form of relative refractive index $\Delta_3$ for outer cladding 30 also helps to eliminate or minimize the cutoff structure/hump, as shown in FIGS. 4A and 4B. Because of the shape of the clad-index, the higher-order modes do not couple with the fundamental mode. The higher-order modes are also lossy. This helps to measure cutoff reliably because the higher-order modes are stripped away.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of forming an optical fiber having a core and a cladding, comprising:
   a) performing an overclad laydown process on a core cane to create a silica soot preform having a soot overclad layer disposed around the core cane, wherein the silica soot perform has a tailored radial soot density profile, the tailored radial soot density profile comprising a radial variation in soot density in the soot overclad layer;
   b) doping the soot overclad layer with chlorine using an overclad consolidation process to form a chlorine doped and partially consolidated silica soot preform;
   c) further consolidating the chlorine doped and partially consolidated silica soot preform to form a void-free chlorine doped and consolidated glass preform, the void-free chlorine doped and consolidated silica glass preform having an outer cladding with a radially varying chlorine concentration, the radially varying chlorine concentration having a maximum concentration $C_{MAX}$ and a minimum concentration $C_{MIN}$ with $C_{MAX}$ being at least 1000 ppm greater than $C_{MIN}$; and
   d) drawing the void-free chlorine doped and consolidated glass preform to form the optical fiber.

2. The method according to claim 1, further comprising removing a portion of the chlorine from an outermost region of the soot overclad layer of the chlorine doped and partially consolidated silica soot preform, the removing providing a radially varying chlorine concentration in the soot overclad layer.

3. The method according to claim 2, wherein the removing is accomplished by exposing the outermost region of the soot overclad layer to at least one of oxygen and water.

4. The method according to claim 2, wherein the removing is accomplished by exposing the outermost region of the soot overclad layer to a dry atmosphere having at least one of helium, nitrogen and argon.

5. The method according to claim 1, wherein the act b) of doping with chlorine comprises exposing the soot overclad layer to at least one of $Cl_2$ and $SiCl_4$.

6. The method according to claim 1, wherein the act b) of doping with chlorine comprises exposing the soot overclad layer to carbon monoxide.

7. The method according to claim 1, wherein the act a) of forming the soot overclad layer includes:
  i) comparing an index profile of an index parameter for a test optical fiber formed from a preform that has a first soot overclad layer having an annular soot density profile to a desired index profile of a reference optical fiber to determine a profile fit error, the index profile comprising a relative refractive index profile or a normalized refractive index profile, the index parameter comprising a relative refractive index or a normalized refractive index;
  ii) dividing the profile fit error by a sensitivity of the index parameter to a soot density to define a soot density error;
  iii) subtracting the soot density error from the annular soot density profile to define a modified annular soot density profile; and
  iv) forming the soot overclad layer using the modified soot density profile to form the silica soot preform.

8. The method according to claim 7, including an additional act v) of forming another test optical fiber using the silica soot preform of act iv) and then repeating acts i) through v) until the soot density error falls below a soot density error threshold value.

* * * * *

UNITED STATES PATENT AND TRADEMARK OFFICE
CERTIFICATE OF CORRECTION

PATENT NO.        : 11,125,937 B2                                    Page 1 of 1
APPLICATION NO.   : 16/124775
DATED             : September 21, 2021
INVENTOR(S)       : Dana Craig Bookbinder et al.

It is certified that error appears in the above-identified patent and that said Letters Patent is hereby corrected as shown below:

On the Title Page

On Page 2, in Column 2, item (56), Other Publications, Line 3, delete "201780058352A," and insert -- 201780058352.4, --, therefor.

In the Specification

In Column 1, Line 8, delete "2016 the" and insert -- 2016, the --, therefor.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*